United States Patent [19]

Hwo

[11] Patent Number: 4,876,156

[45] Date of Patent: Oct. 24, 1989

[54] FILM AND SHEET CAPABLE OF FORMING RETORTABLE AND EASY-OPEN PACKAGINGS

[75] Inventor: Charles C. Hwo, Sugarland, Tex.

[73] Assignee: Shell Oil Company, Houston, Tex.

[21] Appl. No.: 285,567

[22] Filed: Dec. 16, 1988

Related U.S. Application Data

[62] Division of Ser. No. 49,903, May 15, 1987.

[51] Int. Cl.4 .............................................. B32B 27/08
[52] U.S. Cl. .................................... 428/516; 428/349; 428/520; 428/910
[58] Field of Search ............... 420/516, 520, 349, 910; 525/240

[56] References Cited

U.S. PATENT DOCUMENTS

| | | | |
|---|---|---|---|
| 3,496,061 | 2/1970 | Freshour et al. | 161/254 |
| 3,817,821 | 6/1974 | Gallini | 161/165 |
| 3,879,492 | 4/1975 | Botinick | 260/857 |
| 3,900,534 | 8/1975 | Schard | 260/897 |
| 4,075,290 | 2/1978 | Denzel et al. | 260/897 |
| 4,189,519 | 2/1980 | Ticknor | 428/476 |
| 4,335,224 | 6/1982 | Matsuura et al. | 525/240 |
| 4,336,212 | 6/1982 | Yoshimura et al. | 264/22 |
| 4,339,507 | 7/1982 | Kurtz et al. | 428/522 |
| 4,354,004 | 10/1982 | Hughes et al. | 525/240 |
| 4,528,220 | 7/1985 | Hwo | 428/35 |
| 4,539,263 | 9/1985 | Hoh | 428/500 |
| 4,665,130 | 5/1987 | Hwo | 525/240 |
| 4,666,778 | 5/1987 | Hwo | 428/516 |

FOREIGN PATENT DOCUMENTS 2049707 12/1980 United Kingdom .
2060658 5/1981 United Kingdom .

*Primary Examiner*—Edith Buffalow

[57] ABSTRACT

Films or sheets are fabricated from blends of an ethylenic homopolymer or copolymer, a butene-1 homopolymer or copolymer, and a propylene homopolymer or copolymer wherein the weight percent of the homopolymer or copolymer is equal or greater than 25 w % and is less that of the butuene-1 homopolymer or copolymer which result in good peel seal characteristics.

4 Claims, No Drawings

FILM AND SHEET CAPABLE OF FORMING RETORTABLE AND EASY-OPEN PACKAGINGS

This is a division of application Ser. No. 049,903, filed May 15, 1987.

BACKGROUND OF THE INVENTION

The present invention relates to a heat sealable wrapping or packing film which is capable of forming a peelable seal. The seal is achievable either between two films of this kind, or between one film of this kind and a polypropylene packing film without the need for an adhesive between this film and the polypropylene.

A peelable seal is defined to be the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

In the past, many varieties of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. While capable of forming a peel seal, the film of '519 discloses polybutylene as a minor component. The blend of '519 bonds to high density polyethylene (HDPE) without the use of adhesive, but will not bond to polypropylene without an adhesive.

U.S. Pat. No. 3,900,534 to Mobil Oil Corporation discloses thermoplastic shrink films with good heat seal characteristics and good optical properties, however, '534 does not address the need for a peel seal film.

U.S. Pat. No. 3,817,821 to E. I. DuPont de Nemours & Co. discloses blends of EVA with polybutylene at 20–40 w % however, '821 does not include polypropylene in the blend.

U.S. Pat. No. 3,879,492 to UCB S.A. Belgium discloses blends of polybutylene+styrene-butadiene copolymer+LDPE+HDPE+polyisobutylene however, '492 fails to include polypropylene in the blend.

U.S. Pat. No. 4,539,263 to E.I. DuPont de Nemours & Co. discloses peel seals based on blends of comonomers and propylene/α-olefin copolymer, however, '263 does not provide disclosure directed to polybutylenes.

U.S. Patent Application Ser. No. 750,342 discloses blends of polybutylene+EVA (or polyethylene)+polypropylene with polypropylene being less than 15 weight percent in the blend. However, none of these references teaches the novel invention.

There has been a long felt need for a wrapping or packing material having easy peelability at the seal and yet which will bond to polypropylene without the aid of an adhesive and which are retortable at temperature of 250° F. or above.

SUMMARY OF THE INVENTION

It has now been found that certain properties including film retortability at 250° F. and above, heat seal strength, and peel seal characteristics of wrapping films or sheets may be improved by fabricating films or sheets from blends of a major content of butene-1 homopolymer or copolymer (>50 w %), a minor content of ethylene homopolymer or copolymer (<25 w %) and a propylene homopolymer or copolymer provided the amount of propylene is equal or greater than 25 weight percent. Such films or sheets are bonded to a polypropylene substrate by coextrusion or extrusion lamination. Reference is made within this application to films, but sheets may be formed, as well.

In the present invention, the film comprises a mixture containing preferably no more than 25 percent by weight of an ethylenic homopolymer or copolymer (such as polyethylene or EVA), equal to or less than 70 percent by weight of polybutylene, and at least 25 percent by weight of polypropylene. The mixture of polymers may range from about 5 percent by weight to about 25 percent by weight of the ethylenic homopolymer or copolymer, from about 50 percent by weight to about 70 percent by weight of the butene-1 homopolymer of copolymer and from about 25 percent by weight to about 45 percent by weight of the propylene homopolymer or copolymer.

DETAILED DESCRIPTION OF THE PREFERRED EMBODIMENT

Applicants have found that a wrappable film may be made which is capable of forming peel seals and comprises a mixture containing from about 5 percent by weight to about 25 percent by weight of an ethylenic homopolymer or copolymer, from about 50 percent by weight to about 70 percent by weight of a butene-1 homopolymer or copolymer, and from about 25 percent by weight to about 45 percent by weight propylene homopolymer or copolymer.

More preferably, the film composition comprises a mixture which contains from about 10 percent by weight to about 20 percent by weight of the ethylenic homopolymer or copolymer, from about 55 percent by weight to about 60 percent by weight of the butene-1 homopolymer or copolymer, and from about 25 percent by weight to about 45 percent by weight of the propylene homopolymer or copolymer.

Most preferably, the film composition comprises a mixture which contains about 10 percent by weight of the ethylenic homopolymer or copolymer, about 65 percent by weight of the butene-1 homopolymer or copolymer, and about 25 percent by weight of the propylene homopolymer of copolymer.

The ethylenic homopolymer or copolymer may be linear low density polyethylene (LLDPE), low density polyethylene (LDPE), medium density polyethylene (MDPE), ethylene vinyl acetate copolymer (EVA), ethylene-methyl acrylate copolymer (EMA) ethylene-ethyl acrylate copolymer (EEA), ethylene-butyl acrylate copolymer (EBA), or high density polyethylene (HDPE) and is most preferably low density polyethylene or ethylene vinyl acetate copolymer.

The propylene homopolymer or copolymer is blended for improvement of the processability of the mixture and retortability (Resistance to the temperature of the retort).

The novel polymer mixtures may be formed into an oriented or unoriented film by casting or film blowing method. After fabrication the film can be heat sealed by sealing jaws at a preset temperature, pressure and dwell. The seal strength is tested by an Instron tensile tester at 10"/min. crosshead speed. Maximum strength on a one inch width strip was designated as peel seal strength.

These manufacturing techniques apply to film, although this invention may also apply to sheeting. Film refers to shaped plastics that are comparatively thin and have a maximum thickness of 0.010 inches (10 mils). Sheeting is a shaped plastic having a thickness greater than 0.010 inches.

The present invention may also comprise the coating layer of a laminated structure which comprises polypropylene as the substrate. The peel seal coat, which consists of a mixture of high content polybutylene, polypropylene and either polyethylene or EVA, would be coated or laminated onto the substrate selected.

The laminated structure can be made by making two separate films that are then laminated. The lamination may be prepared from two separate films which were prefabricated by either film blowing (melt extrusion with a circular die) or the casting method (a flat die-melt extrusion process).

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers and colorants by means of Banbury mixers. The resulting mix is extruded through rod shaped dies and chipped into pellets. Pelletized polymer is fed into a screw conveyer into the end of a screw-type extruder and is heated and made into viscous fluid in a cylinder by means of a revolving, helical screw. The sheet emitting from the die is quenched on a temperature controlled chill roll. Finished films may be subject to a two-way stretching using continuous tenter-frame operations in biaxially orientation.

EXAMPLE 1

Cast Film

DURAFLEX ® Polybutylene PB8240 having a melt index of about 2.0 dg/mins (ASTM method D-1238 condition "E") and a density of about 0.901 was dry blended in a tumbler mixture with 12 w % of EVA (USI UE632) and 20 w % or 35 w % polypropylene (Shell PP5820) separately. The resultant blends were coextruded with polypropylene (Shell PP DX5097) a die temperature of about 220° C. into film of about 5.25 mils in thickness using a flat die. Peel sample strength was tested. The coextruded films were laminated together in face to face contact, using 40 pounds per square inch of pressure and a dwell time of about 0.5 seconds. After the film was cooled, one inch wide strips were cut from the film at locations across its width for testing of their seal strengths. Physical properties are given for the various films.

TABLE 1

Peel Seal Strength Versus Sealing Temperature For Retortable PP Films

| Coextruded Film Structure | Peel Seal Strength, lb./inch Sealing Temperature, °F. | | | |
|---|---|---|---|---|
| | 260 | 270 | 280 | 290 |
| PP1/(PB + 12 w % EVA + 20 w % PP) 3.5 mils/1.75 mils | 2.20 | 2.09 | 1.81 | 1.83 |
| PP1/(PB + 12 w % EVA + 35 w % PP) 3.5 mils/1.75 mils | 1.76 | 2.09 | 2.08 | 2.20 |
| PP1/(PB + 10 w % EVA + 25 w % PP) 3.5 mils/1.75 mils | 2.26 | 2.54 | 2.45 | 2.82 |

Note:
PP1 is Shell polypropylene DX5097 at 4.0 melt flow.
PB is Shell DURAFLEX ® PB8240 at 2.0 melt index.
EVA is USI UE632 at 15 w % VA content and 8.5 melt index.
PP is Shell polypropylene 5820 at 12.0 melt flow.

As may be seen from Table 1, three different blend compositions were tested for seal strength in pounds per inches at sealing temperatures of 260°, 270°, 280°, and 290° F. A satisfactory peel seal value is 1.5 lb/in or above. From examples of this Table 1 it has been unexpectedly found by applicant that the mixture of about 20 to 35 wt % percent of a propylene homopolymer or copolymer, about 50 to 70 percent butene-1 homopolymer or copolymer, and about 5 wt % [percent] ethylenic homopolymer or copolymer results in a unique film which has good peel seal strength, good processability and will bond by coextrusion or extrusion lamination to a polypropylene substrate in a laminar structure without the need for an adhesive to achieve such bonding.

The coextruded film structure of PP1/(PB+10 w % EVA+25 w % PP) was further tested on its autoclavability at 250° F. This mentioned film was sealed to itself at 280° F. jaw temperature with 0.5 second dwell and 40 psi pressure. The sealed film was filled with water and placed in an autoclave (pressure cooker) at 250° F. for 30 minutes. At the end of autoclave cycle, the sealed pouch remained unopen showing the ability to withstand the autoclave conditions.

What is claimed is:

1. A laminar structure comprising a polypropylene substrate to which is bonded by extrusion lamination a film or sheet which is capable of forming peel seals, comprising a mixture containing:
   from about 5 percent by weight to about 25 percent by weight of an ethylenic homopolymer or copolymer selected from the group consisting of linear low density polyethylene (LLDPE), low density polyethylene (LDPE), medium density polyethylene (MDPE), ethylene vinyl acetate copolymer (EVA), ethylene-methyl acrylate copolymer (EMA), ethylene-ethyl acrylate copolymer (EEA), ethylene-butyl acrylate copolymer (EBA), and high density polyethylene (HDPE);
   from about 50 percent by weight to about 75 percent by weight of the butene-1 homopolymer or copolymer; and
   from about 25 percent by weight to about 45 percent by weight of propylene homopolymer or copolymer.

2. The laminar structure of claim 1 which contains:
   from about 10 percent by weight to about 15 percent by weight of said ethylenic homopolymer or copolymer;

from about 55 percent by weight to about 60 percent by weight of said butene-1 homopolymer or copolymer; and from about 25 percent by weight to about 35 percent by weight of said propylene homopolymer or copolymer.

3. The laminar structure of claim 1 which contains:

about 10 percent by weight of said ethylenic homopolymer or copolymer;

about 65 percent by weight of said butene-1 homopolymer or copolymer;

about 25 percent by weight of said propylene homopolymer or copolymer.

4. The laminar structure in claim 1, wherein said film or sheet is unoriented or oriented.

* * * * *